United States Patent
Jeong

(10) Patent No.: US 9,615,152 B2
(45) Date of Patent: Apr. 4, 2017

(54) OPTICAL ELEMENT AND LIGHT RECEIVING DEVICE

(71) Applicants: FUJITSU LIMITED, Kawasaki-shi, Kanagawa (JP); Photonics Electronics Technology Research Association, Bunkyo-ku, Tokyo (JP)

(72) Inventor: Seokhwan Jeong, Sagamihara (JP)

(73) Assignees: FUJITSU LIMITED, Kawasaki (JP); PHOTONICS ELECTRONICS TECHNOLOGY RESEARCH ASSOCIATION, Tokyo (JP)

(*) Notice: Subject to any disclaimer, the term of this patent is extended or adjusted under 35 U.S.C. 154(b) by 15 days.

(21) Appl. No.: 14/730,680

(22) Filed: Jun. 4, 2015

(65) Prior Publication Data

US 2016/0007105 A1    Jan. 7, 2016

(30) Foreign Application Priority Data

Jul. 7, 2014    (JP) .................................. 2014-140063

(51) Int. Cl.
*H04B 10/08*    (2006.01)
*H04B 17/00*    (2015.01)
(Continued)

(52) U.S. Cl.
CPC ..... *H04Q 11/0005* (2013.01); *H04B 10/0795* (2013.01); *H04B 10/60* (2013.01);
(Continued)

(58) Field of Classification Search
CPC ....... H04Q 11/0005; H04Q 2011/0015; H04Q 2011/0016; H04Q 2011/0035; H04J 14/02;
(Continued)

(56) References Cited

U.S. PATENT DOCUMENTS 5,790,721 A * 8/1998 Lee ...................... H01S 3/06754
                                                    359/349
6,538,787 B1 * 3/2003 Moeller ................. G02B 6/272
                                                    359/249
(Continued)

FOREIGN PATENT DOCUMENTS

JP    2009-244326 A1    10/2009

*Primary Examiner* — Ken N Vanderpuye
*Assistant Examiner* — Abbas H Alagheband
(74) *Attorney, Agent, or Firm* — Kratz, Quintos & Hanson, LLP

(57) ABSTRACT

An optical element includes: a polarization splitter that splits light input from an input port into a first signal and a second signal according to a plane of polarization; a polarization rotator that rotates a plane of polarization of the second signal output from the polarization splitter by 90 degrees; a first optical coupler that combines the first signal output from the polarization splitter and the second signal output from the polarization rotator and splits the resultant signal into a third signal and a fourth signal with an equal amplitude; a phase controller that controls a phase of the third signal; and a second optical coupler that combines the third signal output from the phase controller and the fourth signal output from the first optical coupler and splits the resultant signal into a fifth signal and a sixth signal with an equal amplitude.

6 Claims, 6 Drawing Sheets

(51) Int. Cl.
*H04Q 11/00* (2006.01)
*H04J 14/02* (2006.01)
*H04B 10/60* (2013.01)
*H04B 10/079* (2013.01)
*H04B 10/67* (2013.01)

(52) U.S. Cl.
CPC ........... *H04B 10/67* (2013.01); *H04B 10/676* (2013.01); *H04J 14/02* (2013.01); *H04Q 2011/0015* (2013.01); *H04Q 2011/0016* (2013.01); *H04Q 2011/0035* (2013.01)

(58) Field of Classification Search
CPC .... H04B 10/0795; H04B 10/60; H04B 10/67; H04B 10/676
USPC .......................................................... 398/84
See application file for complete search history.

(56) References Cited

U.S. PATENT DOCUMENTS

| | | | | |
|---|---|---|---|---|
| 7,428,355 B2* | 9/2008 | Terada | ................ | G02B 6/12019 385/15 |
| 7,450,863 B2* | 11/2008 | Winzer | ................ | H04B 10/677 398/202 |
| 7,877,020 B1* | 1/2011 | Hayes | ................... | H04B 10/50 398/183 |
| 8,064,769 B2* | 11/2011 | Galli | ................... | H04J 14/0206 398/83 |
| 8,213,802 B2* | 7/2012 | Little | ................. | G02B 6/12004 398/121 |
| 8,320,779 B2* | 11/2012 | Fukuchi | ................. | H04B 10/66 398/158 |
| 9,235,100 B1* | 1/2016 | Kaplan | .................... | G02F 1/225 |
| 2003/0053167 A1* | 3/2003 | Xu | ..................... | G02B 6/29386 398/79 |
| 2004/0136647 A1* | 7/2004 | Mizuno | .............. | G02B 6/12007 385/24 |
| 2004/0257564 A1* | 12/2004 | Madsen | ............. | H04B 10/2569 356/364 |
| 2005/0276539 A1* | 12/2005 | Fukuda | .............. | G02B 6/29353 385/24 |
| 2008/0253767 A1* | 10/2008 | Galli | ................... | H04J 14/0206 398/45 |
| 2009/0245796 A1* | 10/2009 | Little | ................. | G02B 6/12004 398/79 |
| 2009/0245801 A1* | 10/2009 | Little | ................. | G02B 6/12004 398/89 |
| 2009/0290876 A1* | 11/2009 | Fukuchi | ................. | H04B 10/66 398/79 |
| 2011/0318014 A1* | 12/2011 | Von Lerber | .......... | H04B 10/677 398/115 |

* cited by examiner

OPTICAL ELEMENT AND LIGHT RECEIVING DEVICE

CROSS-REFERENCE TO RELATED APPLICATION

This application is based upon and claims the benefit of priority of the prior Japanese Patent Application No. 2014-140063, filed on Jul. 7, 2014, the entire contents of which are incorporated herein by reference.

FIELD

The embodiments discussed herein are directed to an optical element and a light receiving device.

BACKGROUND

An optical element such as a wavelength multi/demultiplexing element is used for optical communication and optical interconnection. As a promising technique for large-capacity interconnection, it has been recently investigated to transmit optical signals through a Si photonic wire waveguide whose mode sectional area is several hundred square μm×several hundred square μm to improve processing capacity by wavelength division multiplexing (WDM). A characteristic variation among polarization components ascribable to structural anisotropy of the Si photonic wire waveguide is a serious problem in application when a WDM optical signal is demultiplexed in a light receiving part, since a polarization state in a transmission channel of optical signals is not kept constant generally. A MRR (micro-ring resonator) type optical wavelength filter having a WDM polarization diversity structure aimed for the suppression of an influence ascribable to the structural anisotropy of the Si photonic wire waveguide has been proposed.

However, the above-described conventional MRR-type optical wavelength filter has a problem that its applicable range is very limited. For example, it is not applicable to a wavelength multi/demultiplexer in which delayed interferometers (DMZI: delayed Mach-Zehnder interferometers) excellent in terms of low loss and wide transmission bandwidth are connected in multi stages.

Patent Literature 1: Japanese Laid-Open Patent Publication No. 2009-244326

SUMMARY

According to an aspect of the embodiments, an optical element includes: a polarization splitter that splits light input from an input port into a first signal and a second signal according to a plane of polarization; a polarization rotator that rotates a plane of polarization of the second signal output from the polarization splitter by 90 degrees; a first optical coupler that combines the first signal output from the polarization splitter and the second signal output from the polarization rotator and splits the resultant signal into a third signal and a fourth signal with an equal amplitude; a phase controller that controls a phase of the third signal; and a second optical coupler that combines the third signal output from the phase controller and the fourth signal output from the first optical coupler and splits the resultant signal into a fifth signal and a sixth signal with an equal amplitude.

According to another aspect of the embodiments, a light receiving device includes: the optical element; a delayed interferometer-type multi/demultiplexer that demultiplexes the sixth signal into a plurality of wavelength signals; and a light-receiver that receives the plural wavelength signals.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Reference Example

Figure 1:
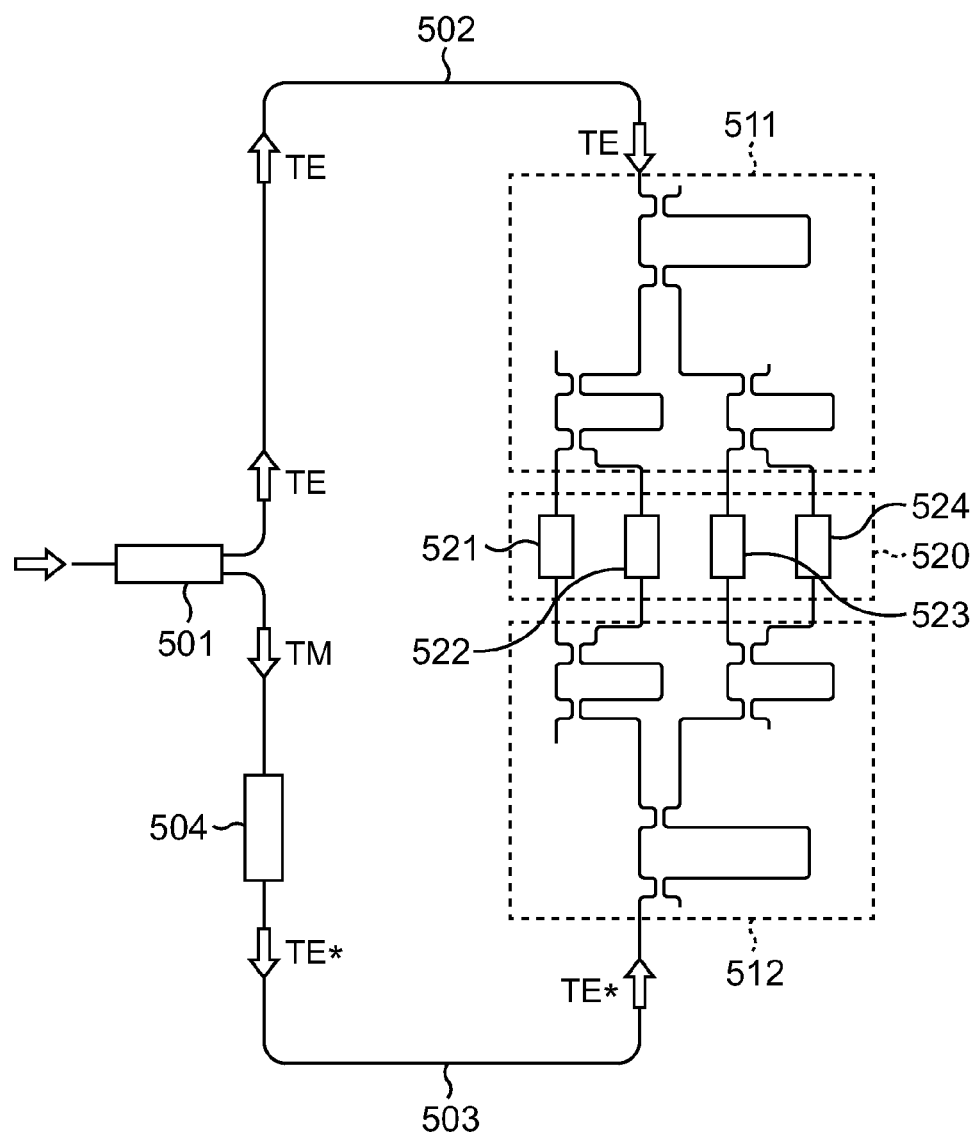
FIG. 1 is a diagram illustrating a structure of a multi/demultiplexer according to a reference example.

The inventor of the present application has found a multi/demultiplexer applicable to a DMZI-type element, while referring to a MRR-type optical wavelength filter. FIG. 1 is a diagram illustrating a structure of the multi/demultiplexer according to the reference example.

As illustrated in FIG. 1, the reference example includes a polarization splitter (PBS) 501 which splits a polarization component of a WDM optical signal into a transverse electric (TE) signal (light in a TE mode) and a transverse magnetic (TM) signal (light in a TM mode) and a polarization rotator (PR) 504 which converts the TM signal into a TE signal (TE* signal). The reference example includes a DMZI-type demultiplexer 511 which demultiplexes the TE signal into four wavelength signals and a DMZI-type demultiplexer 512 which demultiplexes the TE* signal into four wavelength signals. The demultiplexer 511 is connected to the polarization splitter 501 with a waveguide 502, and the demultiplexer 512 is connected to the polarization splitter 501 with a waveguide 503 via the polarization rotator 504. The reference example includes a light receiver 520 including four photodiodes 521 to 524 different in detection wavelength, and the wavelength signals from the demultiplexer 511 and the wavelength signals from the demultiplexer 512 are input to the photodiodes 521 to 524 respectively.

The reference example is applicable to a DMZI-type element. However, the reference example requires the demultiplexer 511 which processes the TE signal and the demultiplexer 512 which processes the TE* signal since the DMZI-type element has only one input port, which inevitably results in a large size of the whole element as compared with a conventional MRR-type optical wavelength filter. As compared with two multi/demultiplexing elements provided in the conventional MRR-type wavelength filter, it is not easy to make element characteristics of the demultiplexer 511 and the demultiplexer 512 uniform. Due to the necessity for multiplexing the wavelength signals in order to input the signals from the demultiplexer 511 and the demultiplexer 512 to the photodiodes 521 to 524, skew adjustment between the both polarization signals is also indispensable. Thus, complicated adjustments are necessary to realize a stable operation.

As a result of further studious studies, the inventor has come up with the following various embodiments. Hereinafter, embodiments will be concretely described with reference to the attached drawings.

First Embodiment

Figure 2:
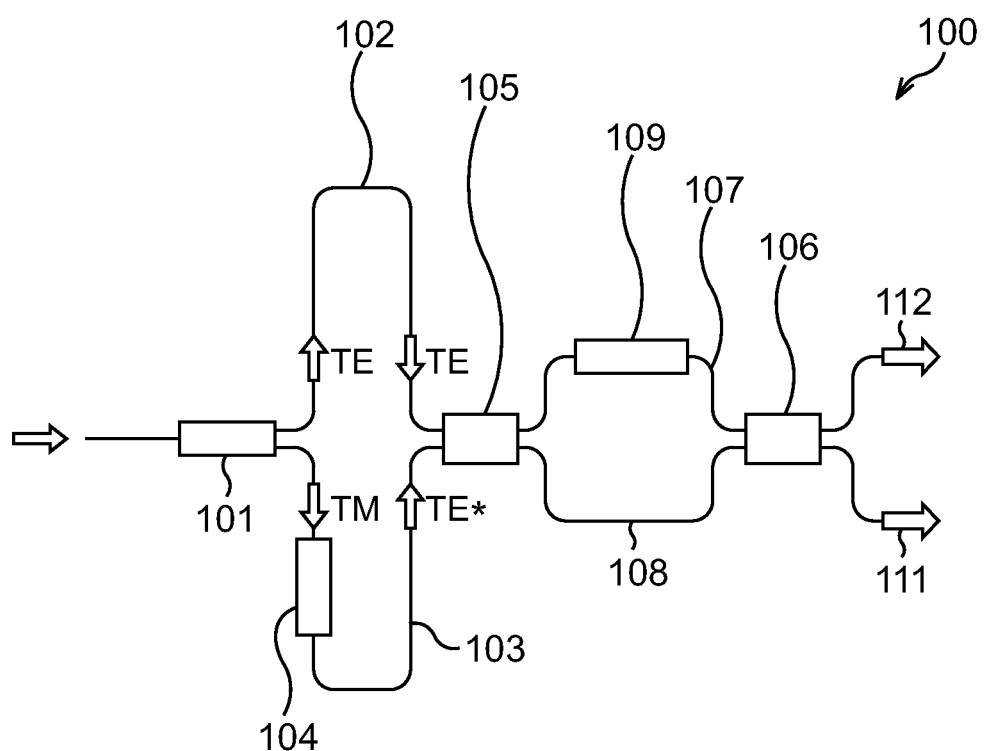
FIG. 2 is a diagram illustrating a structure of an optical element according to a first embodiment.

First, a first embodiment will be described. FIG. 2 is a diagram illustrating a structure of an optical element according to the first embodiment.

As illustrated in FIG. 2, the optical element 100 according to the first embodiment includes a polarization splitter 101 that splits light input from an input port (input light) into a TE signal and a TM signal according to a plane of polarization. The optical element 100 includes a polarization rotator 104 that rotates a plane of polarization of the TM signal output from the polarization splitter 101 by 90 degrees so as to convert the TM signal into a TE* signal. The optical element 100 includes an optical coupler 105 that combines the TE signal output from the polarization splitter 101 and the TE* signal output from the polarization rotator 104. An input side of the optical coupler 105 is connected to the polarization splitter 101 with a waveguide 102 and a waveguide 103, and the polarization rotator 104 is on the waveguide 103. The TE signal propagates through the waveguide 102, and the TM signal and the TE* signal propagate through the waveguide 103. A waveguide 107 and a waveguide 108 are connected to an output side of the optical coupler 105. For example, an optical path length of the waveguide 107 is equal to an optical path length of the waveguide 108. The optical coupler 105 combines the input TE signal and TE* signal, splits the resultant into signals with an equal amplitude and outputs these signals to the waveguide 107 and the waveguide 108. The waveguide 107 and the waveguide 108 are connected to an input side of an optical coupler 106, and a phase controller 109 is on the waveguide 107. The optical coupler 106 combines the signal which has passed through the waveguide 107 and output from the phase controller 109 and the signal which has propagated through the waveguide 108, and splits the resultant into two signals with an equal amplitude, and the output signals of the optical coupler 106 are output to the outside from an output port 111 and an output port 112. The optical coupler 105 and the optical coupler 106 are 3 dB optical couplers, for example. The phase controller 109 includes a microheater, for example. The signal propagating through the waveguide 102 is an example of a first signal, the signal propagating through the waveguide 103 is an example of a second signal, the signal propagating through the waveguide 107 is an example of a third signal, and the signal propagating through the waveguide 108 is an example of a fourth signal. The signal output to the output port 112 is an example of a fifth signal, the signal output to the output port 111 is an example of a sixth signal, the optical coupler 105 is an example of a first optical coupler, and the optical coupler 106 is an example of a second optical coupler.

Figure 3A:
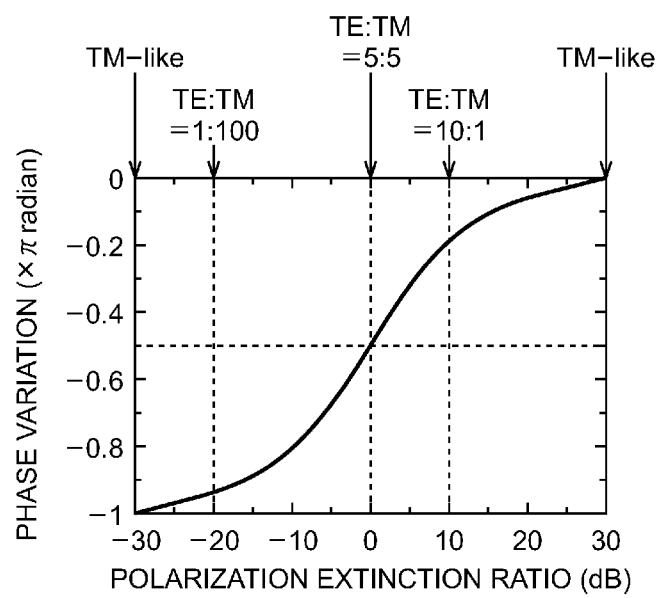
FIG. 3A is a diagram illustrating a relation between a polarization extinction ratio and a phase variation in the first embodiment.
Figure 3B:
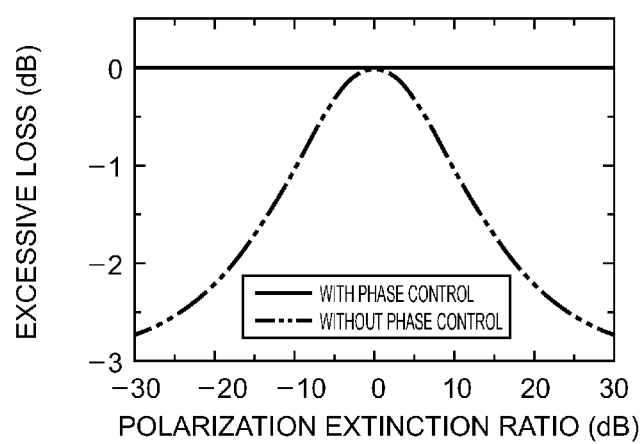
FIG. 3B is a diagram illustrating a relation between a polarization extinction ratio and an excessive loss in the first embodiment.

In the optical element 100, an intensity ratio between the TE signal and the TE* signal input to the optical coupler 105 depends on a ratio of the polarization component (the TE signal and the TM signal) of the input light. The amplitudes of the signals output from the optical coupler 105 to the waveguide 107 and the waveguide 108 are equal to each other, but if they are input to the optical coupler 106 as they are, intensity of the signal output from the output port 111 and intensity of the signal output from the output port 112 are unstable. In this embodiment, the phase controller 109 controls a phase of the signal propagating through the waveguide 107 so that this signal becomes in phase with or in opposite phase to the signal propagating through the waveguide 108 (fourth signal). For example, when a ratio of the TM signal is higher than a ratio of the TE signal in the input light, a phase variation of $-1\pi$ radian to $-0.5\pi$ radian is given to the signal propagating through the waveguide 107 according to the ratio of the TM signal to the input light (polarization ratio), as illustrated in FIG. 3A. Here, a negative polarization ratio indicates that the ratio of the TM mode is higher, and a positive polarization ratio indicates that the ratio of the TE mode is higher. A phase variation of $-0.5\pi$ radian to $-0\pi$ radian is given to the signal propagating through the waveguide 107 as the ratio of the TE signal increases. As a result, an excessive loss can be reduced to output a stable signal from the output port 111 as illustrated in FIG. 3B. In this case, an amount of the phase variation may be adjusted by temperature of the microheater in the phase controller 109, for example.

As described above, according to the optical element 100, it is possible to obtain a stable output state without being influenced by the polarization state of the input light. The optical element 100 is applicable to various wavelength multi/demultiplexers such as a DMZI-type element. In the reference example, since the two demultiplexers are provided, it is necessary to make their element characteristics uniform and the skew adjustment is also necessary, but these complicated adjustments are not necessary in the optical element 100.

Figure 4A:
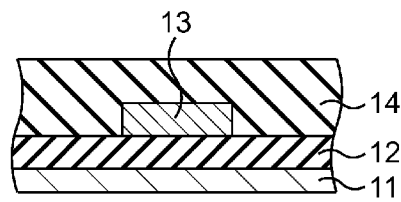
FIG. 4A is a diagram illustrating an example of a sectional structure of a waveguide.
Figure 4B:
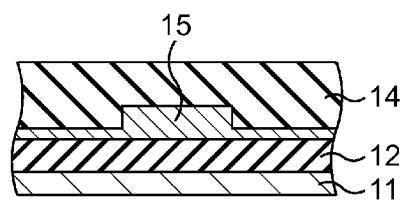
FIG. 4B is a diagram illustrating another example of a sectional structure of a waveguide.

As the waveguide 102, the waveguide 103, the waveguide 107, and the waveguide 108, Si photonic wire waveguides each having a sectional structure illustrated in FIG. 4A are used, for example. A buried oxide layer 12 of Si oxide, a Si layer 13, and a Si oxide layer 14 are provided on a Si substrate 11 In a channel structure illustrated in FIG. 4A. The Si layer 13 has a 220 nm thickness and a 450 nm width. Such a channel structure may be formed in the following manner, for example. First, a SOI substrate including a Si substrate, a layer of a Si oxide, and a Si layer is prepared. Then, a photomask which covers a portion composing a waveguide or an optical coupler is formed by light exposure, electron beam exposure or the like. Thereafter, the Si layer is dry-etched using the photomask to form the Si layer 13 with a predetermined pattern shape. Reactive ion etching is performed, for example, as the dry etching. Subsequently, the Si oxide layer 14 is formed through a vapor deposition method or the like. In the manner as described above, the channel structure including the Si substrate 11, the buried oxide layer 12, the Si layer 13, and the Si oxide layer 14 is obtained. A rib waveguide structure illustrated in FIG. 4B may be adopted. In this case, a Si layer 15 having an about 50 nm slab height is used instead of the Si layer 13.

Figure 5:
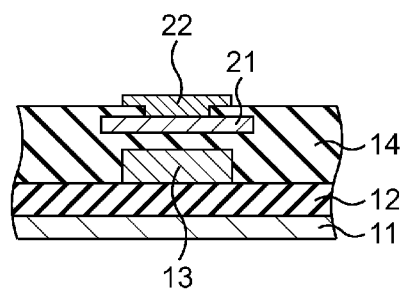
FIG. 5 is a diagram illustrating an example of a sectional structure of a phase controller.

A Si photonic wire waveguide including the microheater having a sectional structure illustrated in FIG. 5 may be used as the phase controller 109, for example. In this structure, a Ti layer 21 is formed as a resistor in the Si oxide layer 14, and an Al layer 22 is connected as an electrode to the Ti layer 21. The Ti layer 21 is formed at a position so that heat generated in the Ti layer 21 reaches the Si layer 13, while being insulated from the Si layer 13.

Second Embodiment

Figure 6:
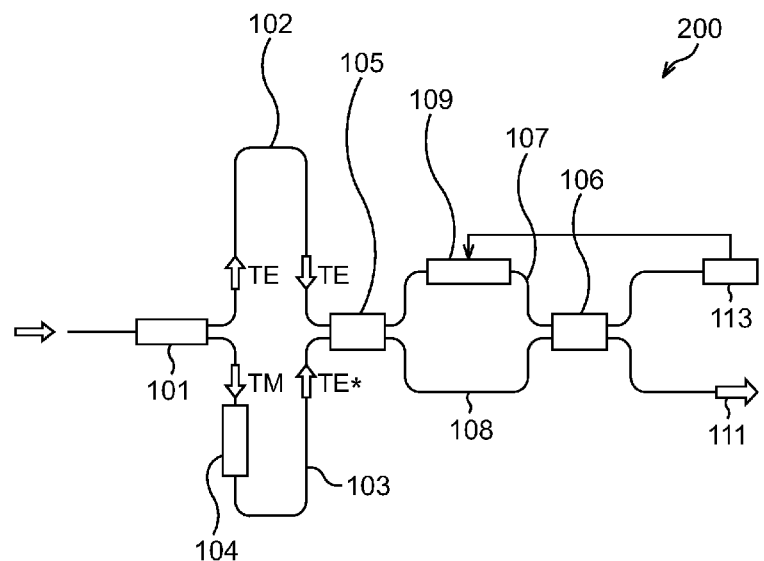
FIG. 6 is a diagram illustrating a structure of an optical element according to a second embodiment.

Next, a second embodiment will be described. FIG. 6 is a diagram illustrating a structure of an optical element according to the second embodiment.

In the second embodiment, as illustrated in FIG. 6, a photodiode 113 is connected to the output port 112, and an output of the photodiode 113 is input to the phase controller 109. The phase controller 109 gives a phase variation to the signal propagating through the waveguide 107 so that a current amount flowing in the photodiode 113 becomes equal to or less than an arbitrary threshold value, preferably, becomes the minimum value. An amount of the phase variation is substantially equal to that indicated in FIG. 3A. The other structure is similar to that of the first embodiment.

The optical element 200 according to the second embodiment can also bring about the same effects as those of the first embodiment. Further, phase control can be easily performed.

Figure 7:
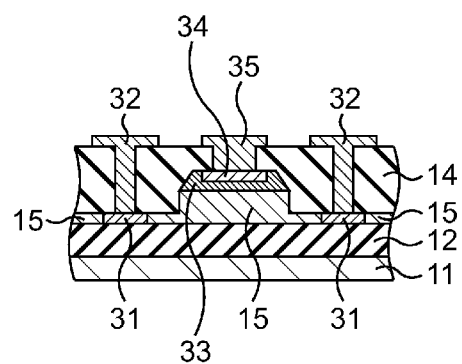
FIG. 7 is diagram illustrating an example of a sectional structure of a photodiode.

A pin diode with a sectional structure illustrated in FIG. 7 is used as the photodiode 113, for example. In this structure, $p^+$ regions 31 are formed in rib regions of the rib waveguide structure illustrated in FIG. 4B, a Ge layer 33 is formed on a core region of the Si layer 15, and an $n^+$ region 34 is formed on a surface of the Ge layer 33. Al layers 32 in contact with the $p^+$ regions 31 and an Al layer 35 in contact with the $n^+$ region 34 are formed as electrodes in the Si oxide layer 14. For example, the $p^+$ regions 31 may be formed by ion implantation of p-type impurities to the rib regions, the Ge layer 33 may be formed by crystal growth on the core region, and the $n^+$ region 34 may be formed by ion implantation of n-type impurities to the Ge layer 33.

As is understood from FIG. 3B, when the polarization ratio is about 10 dB or less, the excessive loss can be reduced to 1 dB or less even without the phase control by the phase controller 109.

Third Embodiment

Figure 8:
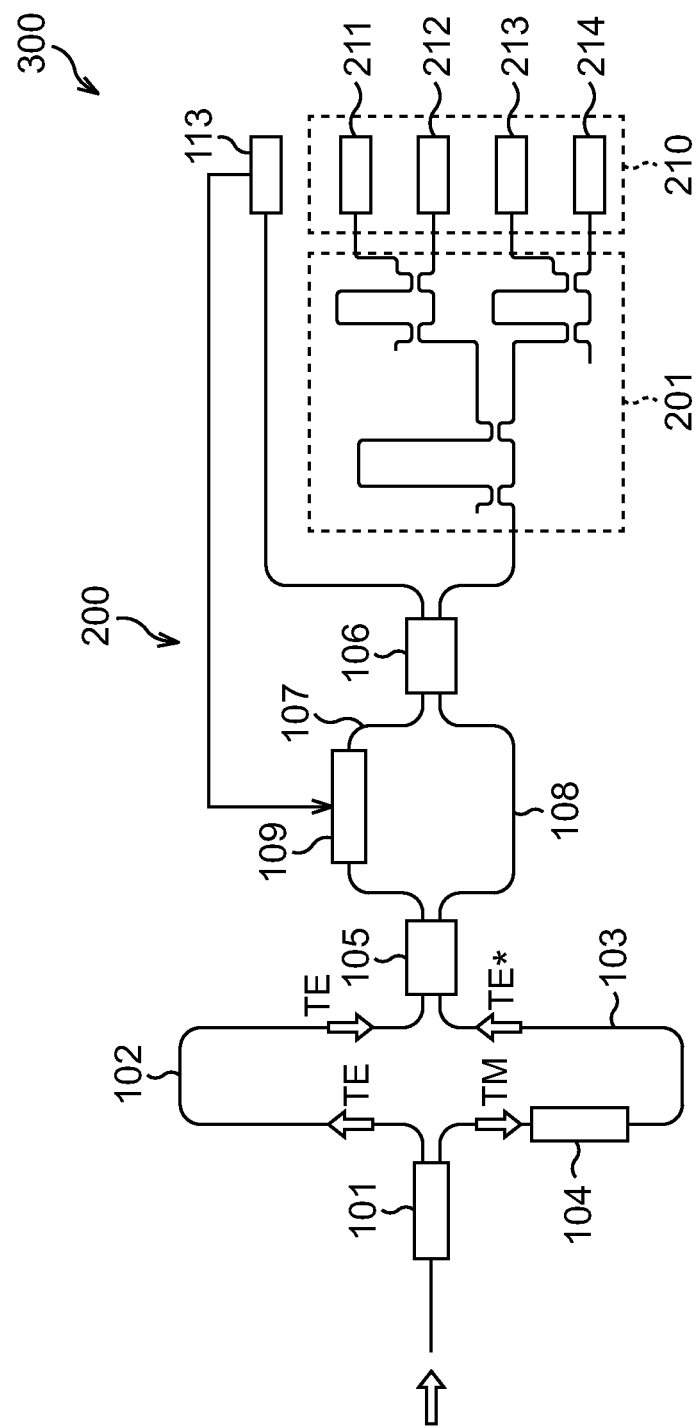
FIG. 8 is a diagram illustrating a structure of a light receiving device according to a third embodiment.

Next, a third embodiment will be described. The third embodiment is an example of a light receiving device. FIG. 8 is a diagram illustrating a structure of the light receiving device according to the third embodiment.

The light receiving device 300 according to the third embodiment includes, as illustrated in FIG. 8, the optical element 200 according to the second embodiment, a demultiplexer 201, and a light receiver 210. The demultiplexer 201 is connected to the output port 111 of the optical element 200, the light receiver 210 includes four photodiodes 211 to 214, and these are connected to four output ports of the demultiplexer 201. A sectional structure of the photodiodes 211 to 214 is similar to that of the photodiode 113 illustrated in FIG. 7, for example, and the photodiode 113 and the photodiodes 211 to 214 are included in one photodiode array, for example. The demultiplexer 201 is an example of a delayed interferometer-type multi/demultiplexer.

In the light receiving device 300, a WDM optical signal in a TE mode stably output from the optical element 200 is input to the demultiplexer 201 to be demultiplexed by the demultiplexer 201. Then, the optical signals with the four wavelengths output from the demultiplexer 201 are detected by the light receiver 210. Thus, it is possible to demultiplex the WDM signal entering in an arbitrary input polarization state, without being influenced by an operation system of the wavelength multi/demultiplexer, and receive the resultant signals. The demultiplexer 511 and the demultiplexer 512 need to be disposed in parallel in the reference example, but only the demultiplexer 201 is provided in this embodiment. Thus, the multiplexing is necessary before the signals are input to the photodiodes 521 to 524 in the reference example, but the multiplexing is not required in this embodiment. Thus, downsizing is possible and high receiving efficiency can be obtained as compared with the reference example.

A MRR-type multi/demultiplexer, an arrayed waveguide grating-type multi/demultiplexer, or an Echelle diffraction grating-type multi/demultiplexer may be connected to the output port 111. A ring resonator array, an arrayed waveguide grating, or an Echelle diffraction grating may be connected to the output port 111.

According to the above-described optical element and so on, since appropriate polarization splitter, polarization rotator, phase controller, and so on are included, an influence of a polarization state of input light can be suppressed, and they are widely applicable.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical element comprising:
   a polarization splitter that splits light input from an input port into a first signal and a second signal according to a plane of polarization;
   a polarization rotator that rotates a plane of polarization of the second signal output from the polarization splitter by 90 degrees;
   a first optical coupler that combines the first signal output from the polarization splitter and the second signal output from the polarization rotator and splits a resultant signal of combining the first signal and the second signal into a third signal and a fourth signal with an equal amplitude;
   a phase controller that controls a phase of the third signal; and
   a second optical coupler that combines the third signal output from the phase controller and the fourth signal output from the first optical coupler and splits a resultant signal of combining the third signal and the fourth signal into a fifth signal and a sixth signal with an equal amplitude,
   wherein the phase controller controls the phase of the third signal according to a polarization state of the light input from the input port.

2. The optical element according to claim 1, further comprising a photodiode that detects intensity of the fifth signal, wherein the phase controller controls the phase of the third signal according to the intensity detected by the photodiode.

3. The optical element according to claim 2,
wherein the phase controller controls the phase of the third signal so that the intensity detected by the photodiode becomes equal to or less than a threshold value.

4. The optical element according to claim 1, further comprising a multi/demultiplexer, a ring resonator array, an arrayed waveguide grating, or an Echelle diffractiong rating to which the sixth signal is input.

5. A light receiving device comprising:
an optical element, the optical element comprising:
- a polarization splitter that splits light input from an input port into a first signal and a second signal according to a plane of polarization;
- a polarization rotator that rotates a plane of polarization of the second signal output from the polarization splitter by 90 degrees;
- a first optical coupler that combines the first signal output from the polarization splitter and the second signal output from the polarization rotator and splits a resultant signal of combining the first signal and the second signal into a third signal and a fourth signal with an equal amplitude;
- a phase controller that controls a phase of the third signal; and
- a second optical coupler that combines the third signal output from the phase controller and the fourth signal output from the first optical coupler and splits a resultant signal of combining the third signal and the fourth signal into a fifth signal and a sixth signal with an equal amplitude;
- a delayed interferometer-type multi/demultiplexer that demultiplexes one of the fifth signal and the sixth signal into a plurality of wavelength signals; and
- a light-receiver that receives the plural wavelength signals,
wherein the phase controller controls the phase of the third signal according to a polarization state of the light input from the input port.

6. A light receiving device comprising:
an optical element, the optical element comprising:
- a polarization splitter that splits light input from an input port into a first signal and a second signal according to a plane of polarization;
- a polarization rotator that rotates a plane of polarization of the second signal output from the polarization splitter by 90 degrees;
- a first optical coupler that combines the first signal output from the polarization splitter and the second signal output from the polarization rotator and splits a resultant signal of combining the first signal and the second signal into a third signal and a fourth signal with an equal amplitude;
- a phase controller that controls a phase of the third signal;
- a second optical coupler that combines the third signal output from the phase controller and the fourth signal output from the first optical coupler and splits a resultant signal of combining the third signal and the fourth signal into a fifth signal and a sixth signal with an equal amplitude; and
- a photodiode that detects intensity of the fifth signal;
- a delayed interferometer-type multi/demultiplexer that demultiplexes the sixth signal into a plurality of wavelength signals; and
- a plurality of light receiving photodiodes that receive the plural wavelength signals, wherein
the phase controller controls the phase of the third signal according to a polarization state of the light input from the input port and the intensity detected by the photodiode, and
the photodiode that detects the intensity of the fifth signal and the plurality of light receiving photodiodes are included in a photodiode array.

* * * * *